United States Patent [19]

Toshimitsu

[11] 4,086,639
[45] Apr. 25, 1978

[54] MAGNETIC HEAD WHICH MINIMIZES THE EFFECT OF MINUTE VARIATIONS IN THE HEAD GAP

[75] Inventor: Naohiko Toshimitsu, Chichibu, Japan

[73] Assignees: Canon Kabushiki Kaisha, Tokyo; Canon Denshi Kabushiki Kaisha, both of Japan

[21] Appl. No.: 726,751

[22] Filed: Sep. 27, 1976

[30] Foreign Application Priority Data

Sep. 29, 1975    Japan .................................. 50-117522

[51] Int. Cl.² ........................... G11B 5/16; G11B 5/20; G11B 5/22
[52] U.S. Cl. ..................................... 360/126; 360/119; 360/123; 360/125
[58] Field of Search ............... 360/126, 125, 123, 122, 360/119; 336/212, 218, 220, 221

[56] References Cited

U.S. PATENT DOCUMENTS

| | | | |
|---|---|---|---|
| 2,912,515 | 11/1959 | Lufcy | 360/125 |
| 2,992,474 | 7/1961 | Adams et al. | 360/126 |
| 3,365,709 | 1/1968 | Gooch | 360/126 |
| 3,582,572 | 6/1971 | Camras | 360/125 |
| 3,651,278 | 3/1972 | Chupity et al. | 360/123 |
| 3,661,570 | 5/1972 | Moss | 360/125 |
| 3,999,216 | 12/1976 | Berchtold | 360/125 |

Primary Examiner—Alfred H. Eddleman
Attorney, Agent, or Firm—Fitzpatrick, Cella, Harper & Scinto

[57] ABSTRACT

The magnetic head of the present invention has a core thickness set up in accordance with the range of the permeability drop starting frequency of the core material which is determined to reduce the influence imparted to the reproducing frequency characteristic of the head by any minute variation in the technique of making the head gap. The core thickness of the magnetic head may be attained by using a smaller number of superposed layers to form the core than in a conventional magnetic head, and in some cases, a single layer of the core may be used to provide the track width.

4 Claims, 8 Drawing Figures

MAGNETIC HEAD WHICH MINIMIZES THE EFFECT OF MINUTE VARIATIONS IN THE HEAD GAP

BACKGROUND OF THE INVENTION a. Field of the Invention

This invention relates to a magnetic head having a good reproducing frequency characteristic.

b. Description of the Prior Art

Generally considered, the primary factors which affect the reproducing frequency charactristic of a magnetic head include the core loss resulting from the eddy current loss and the gap loss attributable to the operating gap width of the core. In the conventional method of making a magnetic head, a greater number of thin layers are used to form the core as a better frequency characteristic is desired and, thereby, the core loss can be reduced to a negligible extent. Thus, efforts have heretofore been devoted solely to reducing the gap loss in improving the reproducing frequency characteristic of the magnetic head.

In making a magnetic head, it is a requisite to form the core with a uniform gap width which ensures the best reproducing frequency characteristic as noted above, but as a matter of course, errors occur in the operating gap width of the core depending on the manufacturing technique and it has been extremely difficult to to minimize such errors, say, to 0.5 $\mu$m or less, even in the magnetic heads produced on a mass production scale by the best manufacturing method available at present.

However, as the recording wavelength of the tape approaches the operating gap width of the magnetic head on which a magnetic tape slides, the reproducing frequency characteristic of the magnetic head is greatly aggravated by the gap loss Lg which is represented by the following $$Lg = -20 \log \frac{\sin (\pi g/\lambda)}{\pi g/\lambda} \quad (1)$$

where $g$ is the operating gap width and $\lambda$ the recording wavelength. Therefore, the above-mentioned variation in the operating gap width seriously affects the reproducing frequency characteristic, and this has become a very serious problem in considering the characteristic of a tape recorder, such as especially a cassette tape recorder, in which the tape speed is slow but the required upper limit of the reproducing frequency has become 10 to 16 KHz, and it has thus become desirable to minimize the influence imparted to the reproducing frequency characeristic by the variation in the operating gap width.

SUMMARY OF THE INVENTION

It is an object of the present invention to provide a magnetic head which has a core thickness set up so as to prevent the irregularity of the gap width unavoidable in the manufacturing technique from seriously affecting the overall reproducing frequency characteristic of the head.

It is another object of the present invention to provide a magnetic head which may be formed by a decreased number of superposed core layers, thereby improving the working yield and facilitating maintenance of the thickness precision of the core forming the track width, as well as reducing the working cost and enabling a hard material like Sendust to be used as the core material for the magnetic head.

According to the present invention, the magnetic head comprises a highly permeable material having a DC specific permeability ranging from 8000 to 50000, a magnetic core formed of the highly permeable material and provided with an operating gap of 1 $\mu$m to 2.5 $\mu$m to form a ring-shaped closed magnetic circuit, a core thickness dimension set up so that the permeability drop starting frequency of the magnetic core resulting from the core loss is 10 to 200 Hz, and a coil wound on the magnetic core having the core thickness dimension. The core thickness dimension is equal to the track width.

The invention will become more fully apparent from the following detailed description thereof taken in conjunction with the accompanying drawings.

DESCRIPTION OF THE PREFERRED EMBODIMENTS

Figure 1:
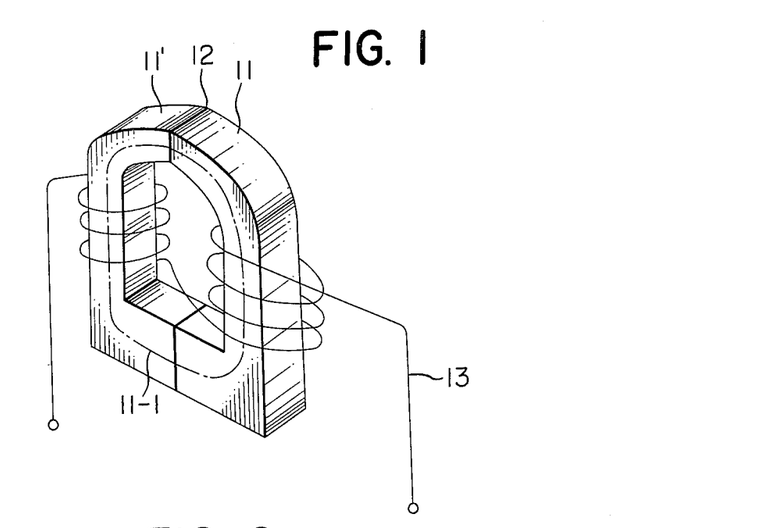
FIG. 1 is a pictorial perspective view of the magnetic head according to the present invention.

Referring to FIG. 1 which is a pictorial perspective view of the magnetic head according to the present invention, core halves 11 and 11' are not superposed upon each other but opposed to each other to form a magnetic path 11-1 and gap 12 and a coil 13 is wound on the core halves.

In the ensuing description of the present invention, analysis will be made of the influence of the core loss and gap loss imparted to the reproducing frequency characteristic.

Figure 2:
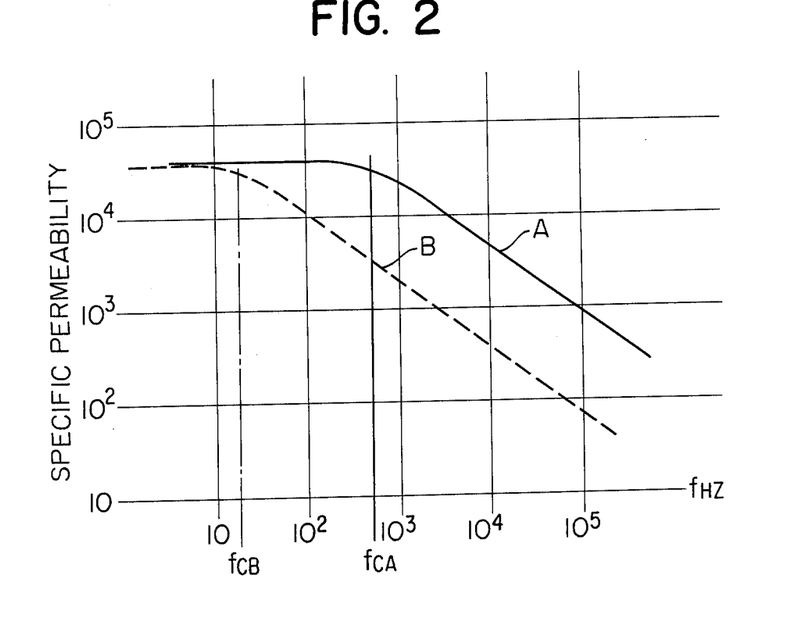
FIG. 2 is a graph illustrating the frequency characteristics of specific permeabilities for various core thicknesses.

The frequency characteristic of the permeability of a magnetic material may generally be known by making the magnetic material into a predetermined thickness $d$, forming therein a closed magnetic circuit into a ring-like shape, winding a coil thereon and measuring the inductances thereof for various frequencies, and such characteristic is usually such as shown in FIG. 2.

In FIG. 2, curve A (solid line) represents the frequency characteristic of the specific permeability of a core material which is 78% Permalloy having a thickness of 0.15 mm and curve B (broken line) represents the frequency characteristic of the specific permeability of a core material which is Sendust having a thickness of 0.6 mm. In the graph of FIG. 2, fcA and fcB represent the frequencies at which the drop of permeability attributable primarily to the eddy current loss and the skin effect of the magnetic flux resulting therefrom starts to take place for the core materials and core thicknesses represented by the curves A and B, and such frequencies become lower as the core thicknesses are increased. (Even if the portion of the Sendust having a core thickness of 0.6 mm is substituted for by 78% Permalloy having a core thickness of 0.6 mm, no variation will occur in the characteristics and the difference in characteristic between the two materials depends primarily on the core thickness. Thus, in FIG. 2, the difference between fcA and fcB, namely, the difference between the curves A and B, results from the difference in core thicknesses and does not mean the difference in quality of material.) Now, let fc generally represent the frequency at which such drop of permeability starts to take place. Usually, at the frequencies below fc, the specific permeability $\mu s$ is nearly constant and substantially equal to DC specific permeability $\mu so$, and at the frequencies above fc, the specific permeability $\mu s$ is decreased in proportion to $f^{-\alpha}$ ($\alpha \doteq 0.6$ to $0.7$).

This may be formulated as follows:

$$\text{When } f < fc, \; \mu s \doteq \mu so \quad (2)$$

$\mu so$ ... DC specific permeability $$\text{When } f > fc, \; \mu s \doteq \mu so \, (f/fc)^{-\alpha} \quad (2)'$$

where $\alpha = 0.6$ to $0.7$

Now, the reproducing efficiency resulting from core loss will be considered.

Figure 3:
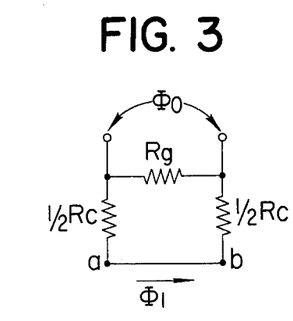
FIG. 3 is an equivalent circuit diagram illustrating the relation between the reproducing magnetic flux and the constant input flux of a usual magnetic head.

The relation between the reproducing magnetic flux $\Phi_1$ of a usual ring-shaped magnetic head and the constant magnetic flux $\Phi_0$ imparted to the operating gap portion of the head may be represented by the use of an equivalent circuit as shown in FIG. 3.

In FIG. 3, Rc represents the magnetic resistance of the core decreased by the core loss, Rg the magnetic resistance of the operating gap, and $\phi_0$ the recording residual flux on the tape but, for simplicity of illustration, various leakage fluxes are not shown.

From FIG. 3, the relation between $\Phi_1$ and $\Phi_0$ is given as:

$$\Phi_1 = \frac{\Phi_0}{1 + Rc/Rg} \quad (3)$$

From this, the reproducing efficiency $\eta = I_1/I_0$ of the head may be deduced thus:

$$\eta = \frac{1}{1 + Rc/Rg}$$

On the other hand, the specific permeability $\mu s$ of the core may be represented by the relation of equation (2)' for $f$ when $f > fc$, as already noted, but the magnetic resistance Rc and the specific permeability $\mu s$ are inversely proportional to each other and usually, Rc is expressed as:

$$Rc = \frac{k}{\mu s} \quad (k \text{ is the proportion constant}) \quad (4)$$

Thus, where the magnetic resistance of the core when $f < fc$ (when $\mu s = \mu so$) is Rco, there is the following relation:

$$Rco = \frac{k}{\mu so} \quad (4)'$$

Therefore, the reproducing efficiency $\eta$ of the head is given by the equations (2)', (4), (4)' and (3)', as follows:

$$\eta = \frac{1}{1 + (Rco/Rg) \cdot (fc/f)^{-\alpha}} \quad (5)$$

$$= \frac{1}{1 + m_o \cdot (fc/f)^{-\alpha}}$$

From this, it is seen that Rg is substantially proportional to the width of the operating gap, so that an increase in the width of the operating gap brings about an increase in the reproducing efficiency $\eta$, thus decreasing the core loss.

Figure 4:
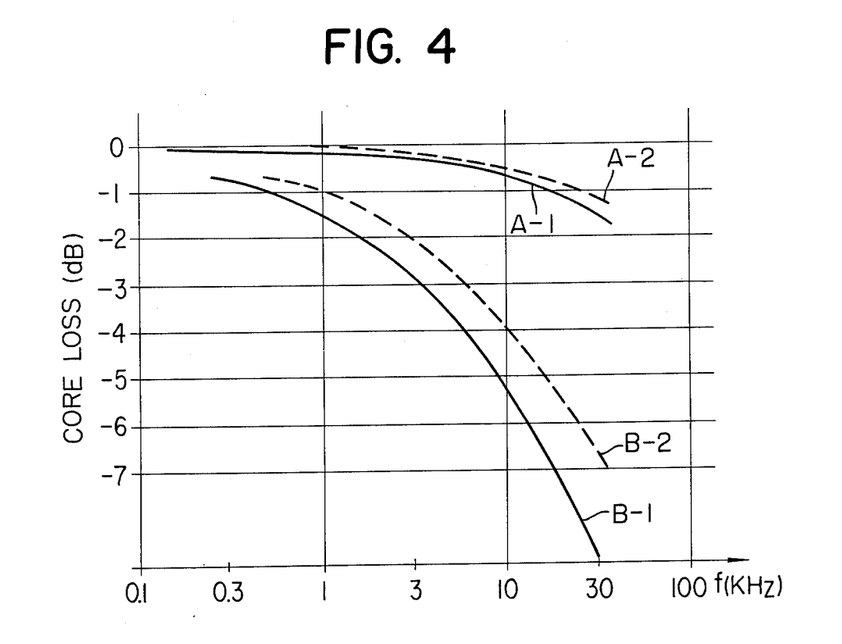
FIG. 4 is a graph illustrating the core losses for various core thicknesses.

A specific example will now be mentioned. In the construction of a commonly available cassette stereo head (gap width $g = 1.3 \, \mu m$, 78% Permalloy, thickness 0.15 mm, four layers superposed), $m_o$ is in the range of 0.02 to 0.04 and fc ranges from 500 to 2000 Hz, and the typical core loss characteristic thereof is such as shown by curve A-1 in FIG. 4, while in the case of Sendust having a thickness of 0.6 mm, a single layer and gap width of 1.3 $\mu m$, $m_o$ equals 0.04 and fc ranges from 20 to 40 Hz and the core loss characteristic thereof is such as shown by curve B-1 in FIG. 4. In FIG. 4, the cases of $g = 1.3 \, \mu m$ (curves A-1, B-1) and $g = 1.9 \, \mu m$ (curves A-2, B-2) are comparatively shown (A refers to the case of Permalloy having a thickness of 0.15 mm and four layers while B refers to the case of Sendust having a thickness of 0.6 mm and a single layer) and it can be seen that the smaller the core thickness and the greater the operating gap width g, the better the core loss characteristic.

The gap loss will now be considered. The gap loss represented by equation (1) shown in the Description of the Prior Art is determined by the operating gap width g of the core and the recording wavelength $\lambda$ for the tape independently of the material of the core, as is clear from equation (1). Incidentally, if $g = 1.5 \, \mu m$ and $\lambda \doteq 3.4 \, \mu m$, Lg at $f = 14$ KHz is thus:
Lg = $-2.98$dB $\doteq$ $-3.0$dB If the operating gap width is increased by 0.5 $\mu m$, $g = 2.0 \, \mu m$ Lg' = $-5.67$dB Thus, Lg is increased by 2.67dB and the reproducing frequency characteristic is correspondingly decreased.

Figure 5:
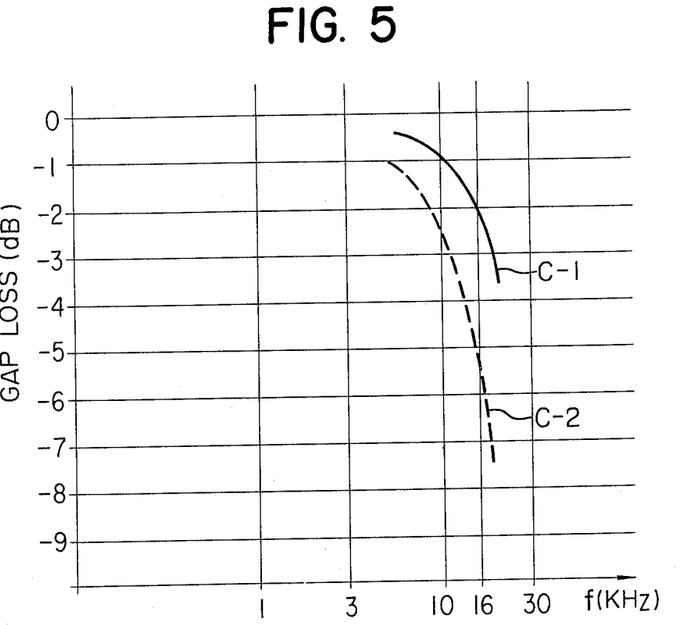
FIG. 5 is a graph illustrating the gap losses for various gap widths.

FIG. 5 illustrates the gap loss characteristics at various frequencies when the gap width $g = 1.3 \, \mu m$ (curve C-1) and $g = 1.9 \, \mu m$ (curve C-2). From this graph, it is seen that an increased gap width g results in aggravated gap loss.

Figure 6:
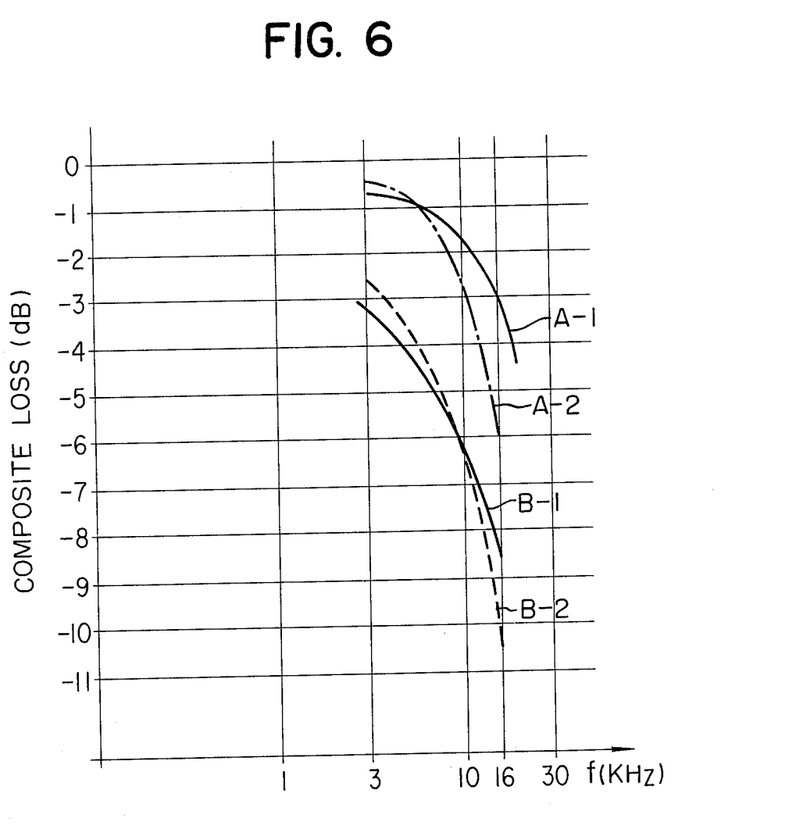
FIG. 6 graphically illustrates the sums of the curves in FIGS. 4 and 5, respectively.

While the individual factors for the core loss and the gap loss have been discussed, the overall reproducing frequency characteristic is determined by the sum of these two factors. FIG. 6 illustrates the composite loss curve which is the sum of the core loss and the gap loss curve in FIG. 5. In the graph of FIG. 6, solid line A-1 indicates the composite loss curve in the case of Permalloy having a thickness of 0.15 mm, four layers and $g = 1.3 \mu$, dot-and-dash line A-2 indicates the composite loss curve in the case of Permalloy having a thickness of 0.15 mm, four layers and $g=1.9\mu$, solid line B-1 indicates the composite loss curve in the case of Sendust having a thickness of 0.6 mm, a single layer and $g=1.3\mu$, and broken line B-2 indicates the composite loss curve in the case of Sendust having a thickness of 0.6 mm, a single layer and $g=1.9\mu$.

In addition to these two types of loss, there is the clearance loss resulting from the clearance between the tape and the head, but such loss is not appreciable in a sufficiently well finished head and may be neglected.

Figure 7:
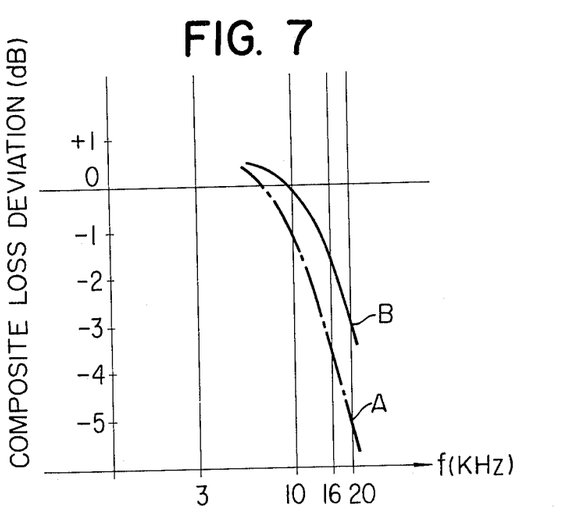
FIG. 7 graphically illustrates the deviation of the composite loss with FIG. 6 as the reference.

FIG. 7 shows the deviation of the composite loss curve for $g=1.9\mu$ with the composite loss curve for $g=1.3\mu$ as the reference. In the graph of FIG. 7, the composite loss curves, for $g=1.3\mu$, of Sendust having a thickness of 0.6 mm and a single layer and Permalloy having a thickness of 0.15 mm and four layers are brought into accord with the O-axis. In the graph, the curve A refers to the case of 78% Permalloy having a thickness of 0.15 mm and four layers, and the curve B refers to the case of Sendust having a thickness of 0.6 mm and a single layer. As seen, in the Sendust having the thickness of 0.6 mm and a single layer (curve B), the increase in gap loss resulting from the increase in gap width is more greatly offset by the decrease in core loss and therefore, the use of this material can more greatly reduce the influence imparted to the reproducing frequency characteristic by the variation in gap width which is unavoidable in the manufacturing process, than the use of the Permalloy core having the thickness of 0.15 mm and four layers (curve A).

Figure 8:
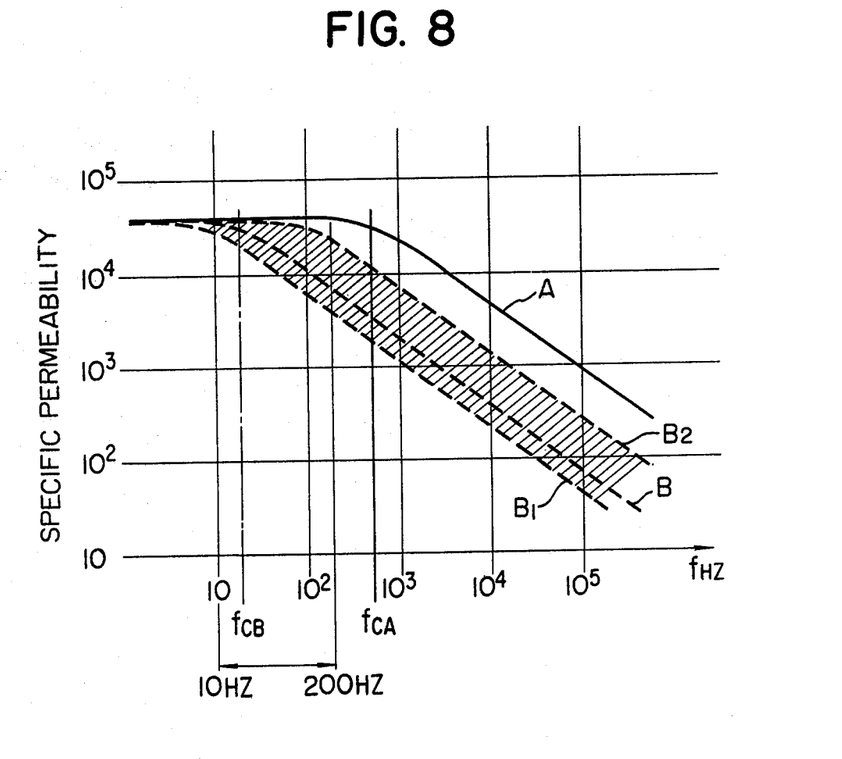
FIG. 8 is a graph illustrating the frequency characteristic of the specific permeability having the inventive core thickness for which the permeability drop starting frequency is clearly shown in the graph of FIG. 2.

FIG. 8 clearly shows the permeability drop starting frequency of the present invention in the frequency characteristic graph of FIG. 2 concerning the specific permeability. In Permalloy or Sendust having a DC specific permeability of 40000, the shaded portion defined between the curve B1 for the permeability drop starting frequency 10 Hz and the curve B2 for the permeability drop starting frequency 200 Hz represents the range over which the core thickness of the present invention is provided. In FIG. 8, it is seen that the curve B of FIG. 7 is represented by the curve B and this curve B is contained within the range of the present invention. Of course, the curve A which is representative of the conventional core comprising superposed layers of small core thickness is not contained within the range of the present invention. Thus, the magnetic head having the core thickness of the present invention can more greatly reduce the influence imparted to the reproducing frequency characteristic by the variation in gap width than the conventional head.

In the foregoing, the difference in characteristic resulting from the difference in core thickness and the difference in gap width has been shown. As regards the core material, the aforementioned portion formed of 78% Permalloy may be substituted for by Sendust without any particular difference resulting therefrom, or vice versa, and both of 78% Permalloy and Sendust are thus suitable as the core material. In the past, however, Permalloy has been the most popular core material for magnetic head. The reason is that Permalloy not only has a high permeability but also is rich in malleability and ready to be sheeted for the formation of a laminated core. On the other hand, Sendust has a high permeability comparable to that of Permalloy but is poor in malleability and this has made it difficult for Sendust to be used as the core material. Nevertheless, as noted above, the present invention enables a greater core thickness that the conventional one to be adopted for the magnetic head and thus, permits the use of Sendust as the core material for the magnetic head.

The DC specific permeability of the core used in the magnetic head of the present invention is in the range of 8000 to 50000, because any specific permeability below 8000 cannot provide a magnetic property suited for the head core and any specific permeability above 50000 encounters difficulties in manufacturing. Further, the head gap in the magnetic head of the present invention is in the range of $1\mu m$ to $2.5\mu m$. This is because a head gap less than $1\mu m$ not only involves difficulties in manufacturing but also increases the influence of irregularity and a head gap greater than $2.5\mu m$ adversely affects the recording frequency characteristic and is undesirable in practice. Furthermore, in the magnetic head of the present invention, the permeability drop starting frequency ranges from 10 to 200 Hz. This range is lower than that of the conventional head and would unavoidably suffer from a greater core loss than before but nevertheless, this is a range which can achieve the intended reduction of the influence on the frequency characteristic resulting from irregularity of the head gap.

The present invention determines the above-described DC specific permeability and head gap and further sets up the core thickness such that the aforementioned permeability drop starting frequency ranges from 10 to 200 Hz (see the shaded portion in FIG. 8). The reason why any frequency below 10 Hz is not used is that such a low frequency reduces the effective permeability. Thus, the present invention can reduce the deviation of the composite loss as shown by the curve B in FIG. 7 and minimize the influence imparted to the reproducing frequency characteristic by the irregularity of the operating gap width of the core.

In the foregoing, of course, the various losses in the reproducing head should desirably be as small as possible and although there are obtained the effects as described above, the core represented by the curve B in FIG. 7, namely, the core comprising a single layer of Sendust having the thickness of 0.6 mm is never superior to the core represented by the curve A, namely, the core comprising four superposed layers of Permalloy each having the thickness of 0.15 mm, inasmuch as the former core suffers from a greater core loss as seen in FIG. 4.

However, if the reproducing output need only be in a range sufficient to secure S/N, it is not particularly necessary to discuss the magnitude of the loss alone but this problem may be compensated for by the characteristic of the reproduce amplifier and where such a point of view can be relied on, the reduction of the range of irregularity which forms a problem in the manufacture of tape recorders will become very important in respect of the quality and cost of the product.

In this sense, the present invention is effective to reduce by half the influence imparted to the reproducing frequency characteristic of the head by any minute technical fluctuation in the manufacture of head gap and this is highly useful in practice.

What is claimed is:

1. A magnetic head comprising:
   core halves including a highly permeable material of a DC specific permeability ranging from 8000 to 50,000, said core halves abutting on each other to establish a ring-shaped closed magnetic circuit therethrough and a gap of 1 $\mu m$ to 2.5 $\mu m$ in width therebetween; and coils wound on said core halves;

said core halves having a thickness such that a permeability drop starting frequency determined by core loss of the highly permeable material is from 10 Hz to 200 Hz, thereby minimizing influence on frequency characteristics of the head due to variations in width of the gap.

2. A magnetic head according to claim 1, wherein the thickness of said core halves is substantially equal to a track width.

3. A magnetic head according to claim 1, wherein said high permeable material comprises Sendust.

4. A magnetic head according to claim 2, wherein said highly permeable material comprises Sendust.

* * * * *

UNITED STATES PATENT AND TRADEMARK OFFICE
CERTIFICATE OF CORRECTION

PATENT NO. : 4,086,639
DATED : April 25, 1978
INVENTOR(S) : NAOHIKO TOSHIMITSU

It is certified that error appears in the above-identified patent and that said Letters Patent are hereby corrected as shown below:

Col. 1, line 38, after "following" insert --approximation--.

Col. 3, line 20, change "$\alpha \doteq 0.6$ to $0.7)$" to --$\alpha \doteqdot 0.6$ to $0.7$--;

Col. 3, line 23, change "$\doteq$" to --$\doteqdot$--;

Col. 3, line 27, change "$\doteq$" to --$\doteqdot$--;

Column 3, line 40, change "$\phi_0$" to --$\overline{\phi}_0$--.

Column 4, line 43, change "$\doteq$" to --$\doteqdot$--.

Column 4, line 45, change "$\doteq$" to --$\doteqdot$--.

Signed and Sealed this

Twenty-ninth Day of May 1979

[SEAL]

Attest:

RUTH C. MASON
Attesting Officer

DONALD W. BANNER
Commissioner of Patents and Trademarks